United States Patent [19]

Rickert

[11] Patent Number: 4,507,841
[45] Date of Patent: Apr. 2, 1985

[54] REMOVAL AND REINSTALLATION OF BOTTOM ENTERING AGITATOR SEALS

[75] Inventor: Robert E. Rickert, Aberdeen, Miss.

[73] Assignee: Vista Polymers Inc., Houston, Tex.

[21] Appl. No.: 611,511

[22] Filed: May 17, 1984

[51] Int. Cl.³ .............................................. B23P 7/00
[52] U.S. Cl. .............................. 29/402.08; 29/402.02; 137/15; 137/315
[58] Field of Search ........................ 29/402.08, 402.02; 137/15, 315

[56] References Cited

U.S. PATENT DOCUMENTS 2,945,709  7/1960  Freed et al. ....................... 29/402.02
3,123,364  3/1964  Ennis ................................ 29/402.02
3,525,529  8/1970  Pfeifer et al. ..................... 29/402.02
3,846,899 11/1974  Gross ............................... 29/402.02

Primary Examiner—Howard N. Goldberg
Assistant Examiner—V. K. Rising
Attorney, Agent, or Firm—Browning, Bushman, Zamecki & Anderson

[57] ABSTRACT

An improved method of removing a seal unit from a process vessel bottom entering agitator assembly and reinstalling a seal unit therein wherein a selectively elevatable table which is movably mounted on a pair of horizontal rails is utilized in lowering and raising seal units during the removal and reinstallation thereof.

7 Claims, 11 Drawing Figures

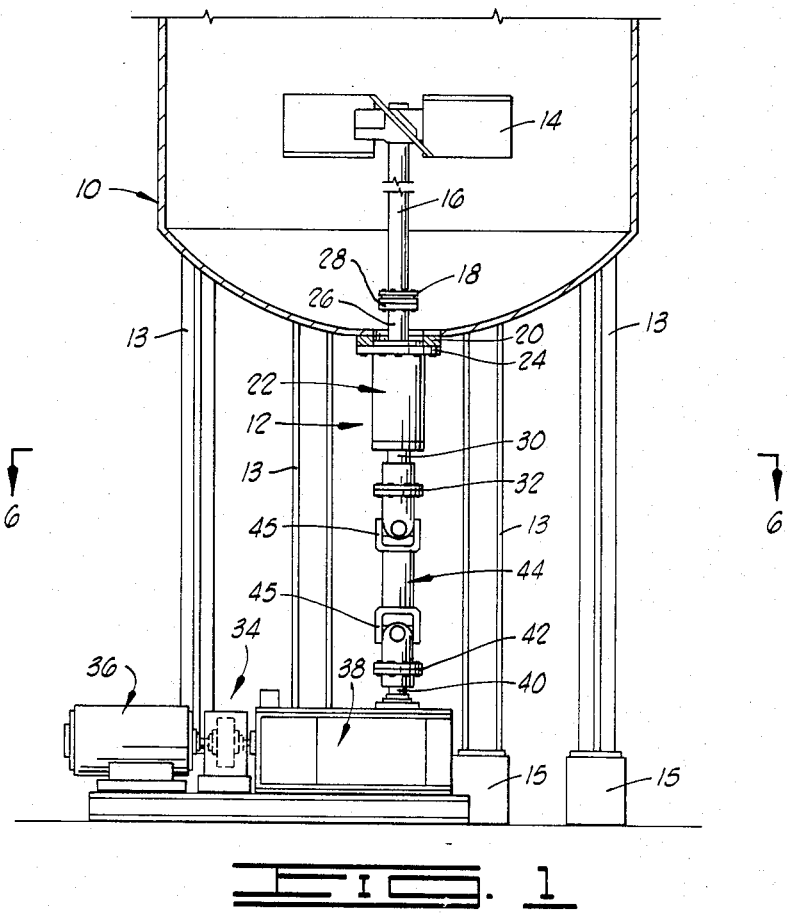

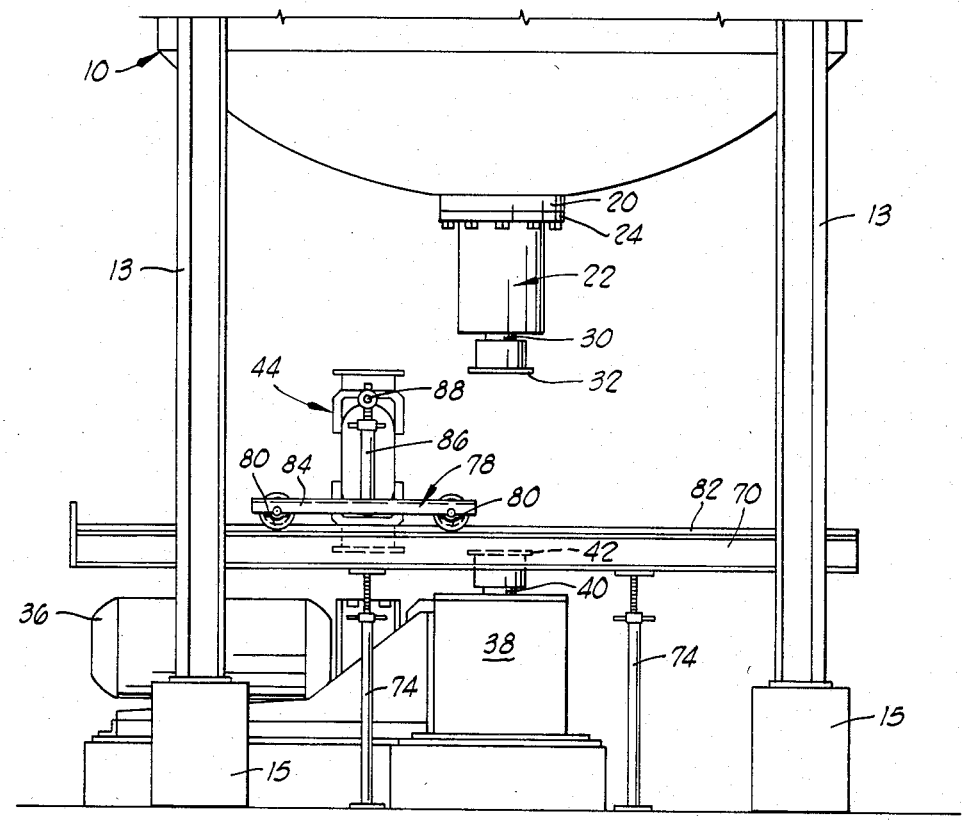
FIG. 7
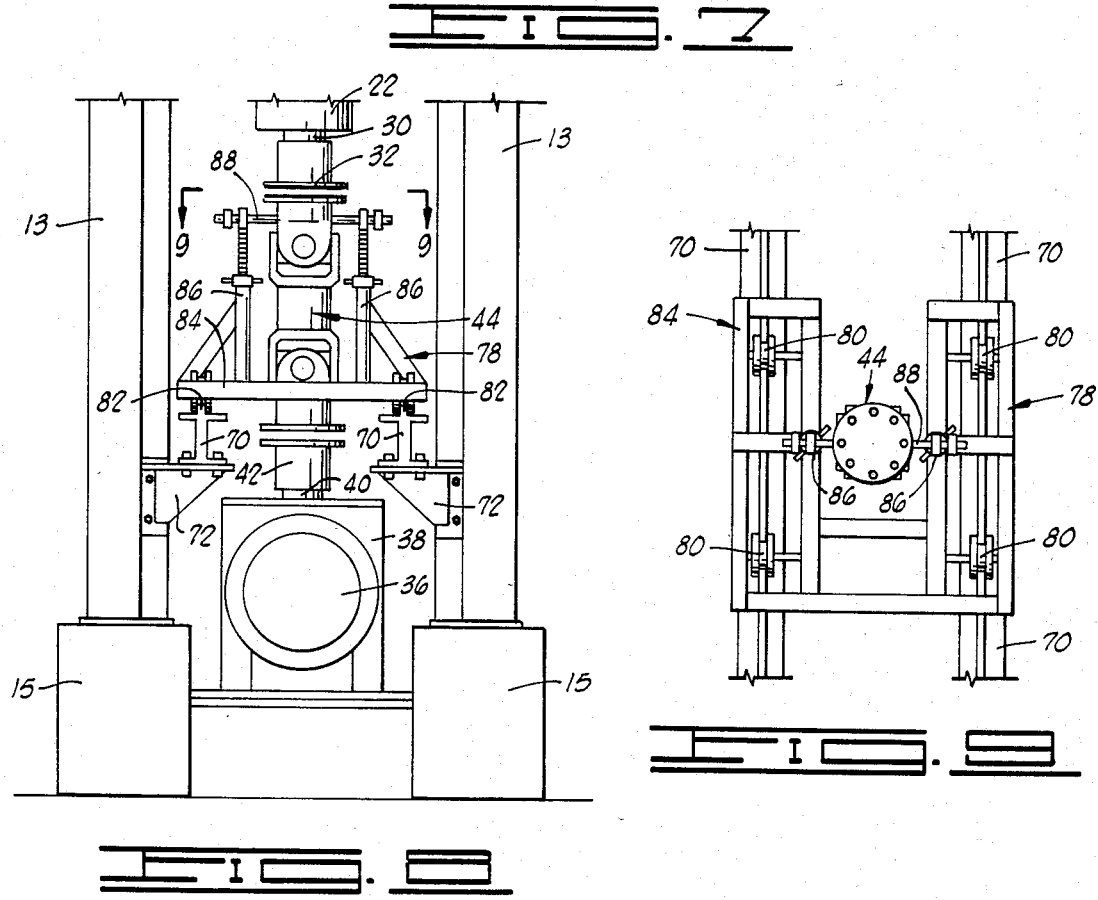
FIG. 8
FIG. 9

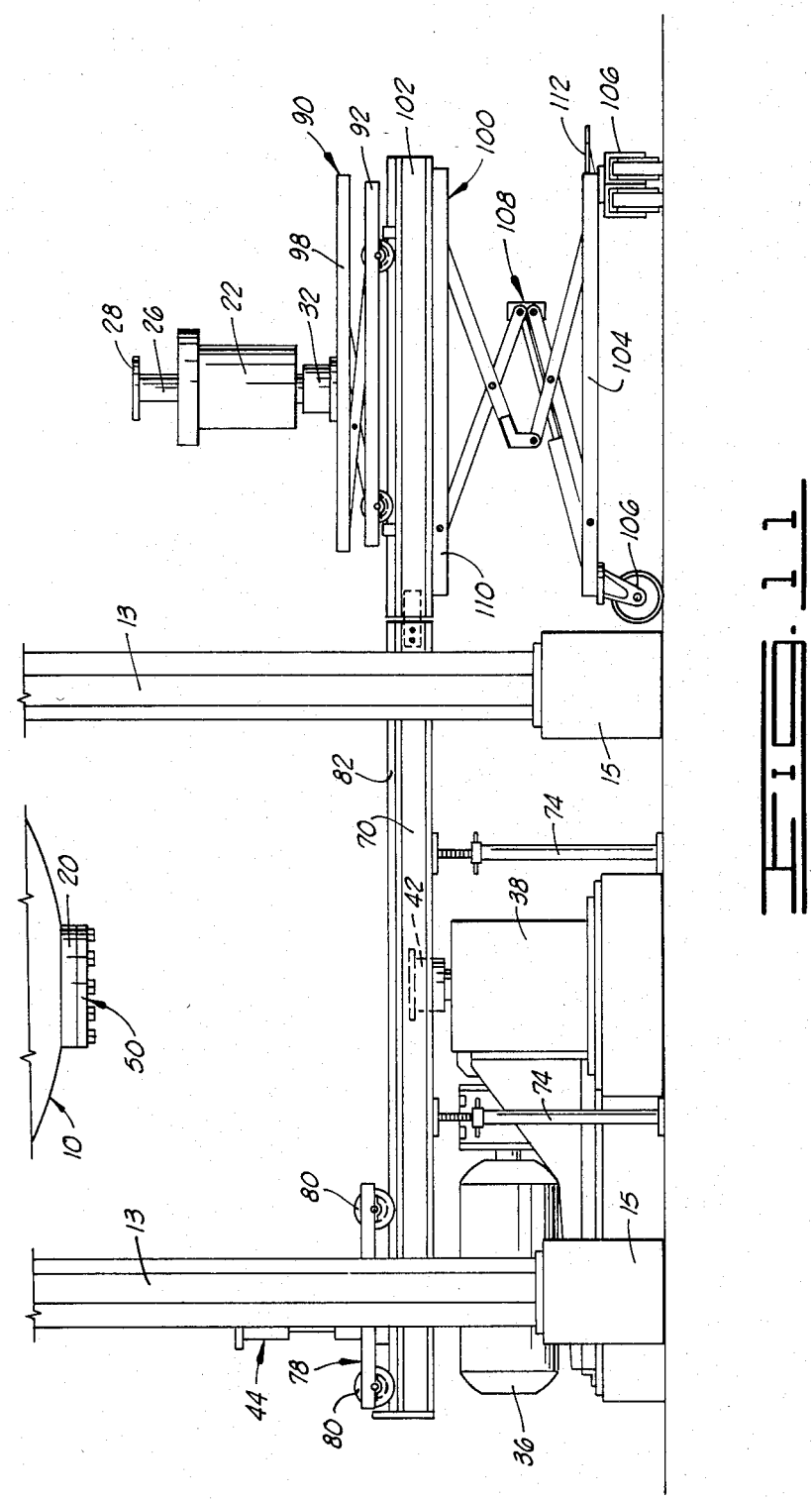

REMOVAL AND REINSTALLATION OF BOTTOM ENTERING AGITATOR SEALS

BACKGROUND OF THE INVENTION

1. Field of the Invention

The present invention relates to the removal and reinstallation of bottom entering agitator seals, and more particularly, but not by way of limitation, to an improved method of removing and reinstalling seal units wherein a movable selectively elevatable table is utilized.

2. Description of the Prior Art

Process vessels which include internal agitators are commonly used in refineries, chemical plants and other similar facilities. In a number of such vessels, the agitator is driven by a vertical shaft which extends through an opening in the bottom of the vessel. A seal unit is provided connected to the vessel which prevents reactants or other fluids within the vessel from leaking out of the vessel around the agitator drive shaft. The seal unit is connected to a coupling shaft, generally including one or more universal joints, which is in turn connected to a rotary drive means such as an electric motor operably connected to a right angle gear box.

The seal units and connector shafts of large agitator assemblies are heavy, and when it is necessary to repair or replace such seal units, the removal and reinstallation thereof has been very difficult. One procedure followed prior to the present invention for removing and reinstalling seal units in a vertically positioned bottom entering agitator assembly has been to remove the coupling shaft extending between the seal unit and the rotary drive means and then to lower and raise the seal unit, agitator shaft and agitator attached thereto in order to secure the agitator and agitator shaft within the vessel using a forklift truck with a platform attached to the forks. Because the weight of the seal unit, agitator shaft and agitator is carried off-center on the forklift truck, the load on the truck is unstable and often causes the seal unit to tip and bind which presents a serious safety hazard.

In an improved procedure described in U.S. Pat. No. 4,358,885, issued Nov. 16, 1982, a jack is substituted for the forklift truck in the lowering and raising operation. While the method using a jack is an improvement, the removal of a seal unit from the jack or placement of a seal unit on the jack is still difficult and dangerous to personnel as is the removal and reinstallation of the coupling shaft.

By the present invention, an improved method is provided which eliminates the safety hazards mentioned above and which brings about the more efficient removal and reinstallation of seal units thereby reducing equipment down time.

SUMMARY OF THE INVENTION

A method of removing a seal unit from a process vessel bottom entering agitator assembly and reinstalling a seal unit therein is provided. The agitator assembly includes an agitator positioned within the vessel, an agitator shaft connected to the agitator having a connector at the bottom end thereof adapted to be connected to a support collar which is in turn adapted to be connected to the vessel, a seal unit having upper and lower shafts extending therefrom, the upper seal unit shaft being connected to the connector at the bottom end of the agitator shaft within the vessel and extending through a flanged opening in the vessel, the seal unit being positioned outside the vessel and connected to the flanged opening in the vessel and a coupling shaft connected to the lower seal unit shaft and to a rotary drive means. The seal unit is removed by removing the coupling shaft from the assembly, disconnecting the seal unit from the flanged opening of the vessel, lowering the seal unit, agitator shaft and agitator connected thereto whereby the connection between the upper seal unit shaft and the agitator shaft is moved to a position outside the vessel, connecting the support collar to the connector at the bottom end of the agitator shaft, raising the seal unit, agitator shaft and agitator whereby the support collar is positioned adjacent the vessel, connecting the support collar to the vessel and then disconnecting the upper seal unit shaft from the agitator shaft whereby the seal unit is removed from the assembly. A seal unit is reinstalled in the assembly by carrying out the above steps in reverse order. By the present invention, elongated horizontally positioned parallel rails are installed beneath the vessel, one on each side of the coupling shaft of the agitator assembly with a selectively elevatable table movably mounted thereon. The selectively elevatable table is utilized in the lowering and raising of seal units during the removal and reinstallation thereof and in the moving of seal units between the agitator assembly and one end of the rails. The rails and elevatable table are removed from beneath the vessel after the seal unit reinstallation is complete.

It is, therefore, a general object of the present invention to provide an improved method of removing a seal unit from a process vessel bottom entering agitator assembly and reinstalling a seal unit therein.

A further object of the present invention is the provision of an improved method of removing and reinstalling seal units in a vessel bottom entering agitator assembly whereby the use of forklift trucks and jack and the hazards attendant thereto are obviated.

Yet a further object of the present invention is the provision of a method of removing a seal unit from a process vessel bottom entering agitator assembly and reinstalling a seal unit therein which is much safer and more efficient than heretofore used methods.

Other objects and advantages of the present invention will be readily apparent to those skilled in the art upon a reading of the description of preferred embodiments which follows when taken in conjunction with the accompanying drawings.

BRIEF DESCRIPTION OF THE DRAWINGS

FIG. 1 is a vertical, partially sectional view of a process vessel having a bottom entering agitator assembly attached thereto.

FIG. 2 is a closeup illustration of a portion of the agitator assembly and vessel of FIG. 1 showing the seal unit, agitator shaft and agitator in a lowered position with guide rods and support collar attached.

FIG. 3 is a cross-sectional view taken along line 3—3 of FIG. 1.

FIG. 4 is a view similar to FIG. 2 showing the seal unit assembly and support collar in a raised position.

FIG. 5 is a view similar to FIG. 4 but showing the support collar attached to the vessel with the guide rods and seal unit removed.

FIG. 6 is an enlarged cross-sectional view taken along line 6—6 of FIG. 1 which additionally illustrates a pair of rails including work platforms attached to support legs of the vessel.

FIG. 7 is a side elevational view of the vessel and bottom entering agitator assembly with rails attached to the vessel support legs, a dolly mounted on the rails and the coupling shaft of the agitator assembly removed and attached to the dolly.

FIG. 8 is an end view of the apparatus illustrated in FIG. 7.

FIG. 11 is a side view similar to FIG. 10 but illustrating a selectively elevatable wheeled platform attached to the rails of FIG. 10 with the selectively elevatable table and seal unit thereon.

DESCRIPTION OF PREFERRED EMBODIMENTS

Figure 9:
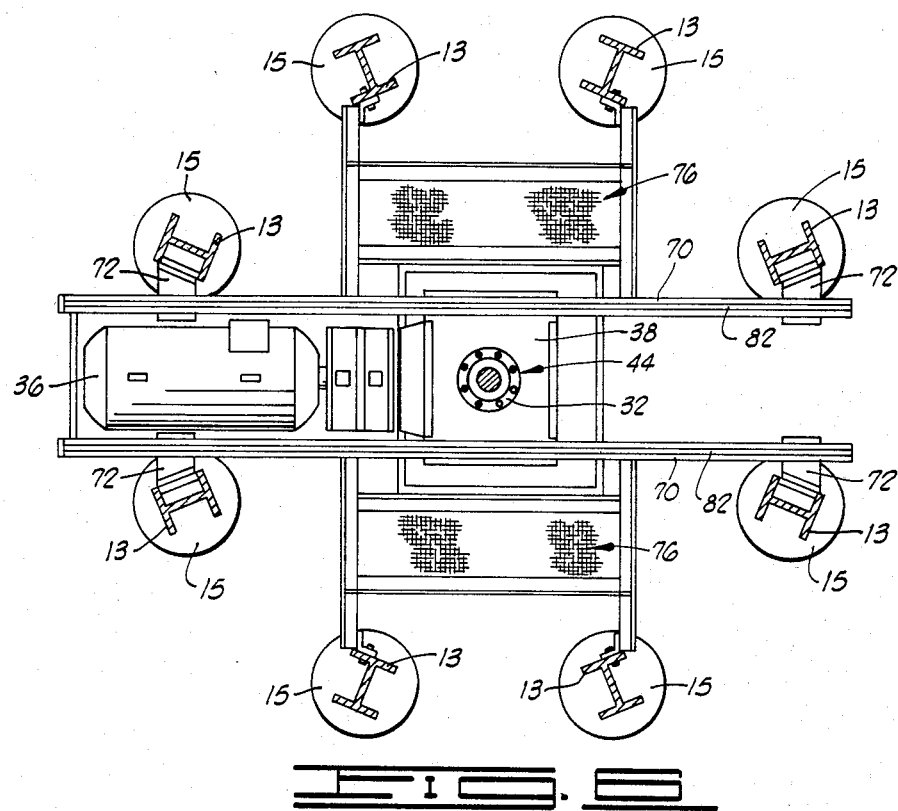
FIG. 9 is a view taken along line 9—9 of FIG. 8.

Referring now to the drawings and particularly to FIG. 1, a process vessel 10 having a bottom entering agitator assembly generally designated by the numeral 12 connected thereto is illustrated. The vessel 10 is supported above ground level by eight support legs 13 which are in turn fixed to concrete footings 15.

The bottom entering agitator assembly 12 is comprised of an agitator 14 positioned within the vessel 10 having a vertical agitator shaft 16 attaached thereto. The bottom end of the agitator shaft 16 includes a connector 18 which can take various forms such as a flange having bolt holes therein for bolted connection to a complementary flange. In addition, as will be described further hereinbelow, the connector 18 includes provision for the clamping of a support collar thereto during the removal and reinstallation of the seal unit in the assembly 12.

The vessel 10 includes a flange opening 20 in the bottom thereof and a conventional seal unit 22 is bolted thereto in a conventional manner. The seal unit 22 functions to provide a seal between the inside of the vessel 10 and a rotary shaft extending therethrough. The seal unit 22 includes a flange 24 at the upper end thereof for bolted connection to the flange 20 of the vessel 10 and an upper shaft 26 extending into the vessel 10. The upper shaft 26 includes a flange or other connector 28 at its upper end for connection to the connector 18 of the agitator shaft 16. A lower shaft 30 extends downwardly from the bottom of the seal unit 22 which includes a flange or other connector 32 at its lower end.

A conventional rotary drive means, generally designated by the numeral 34, is provided which can take various forms. In the form illustrated in FIG. 1, the rotary drive means 34 is comprised of an electric motor 36 connected to a right angle gear box 38. The gear box includes an upwardly extending drive shaft 40 having a connector 42 attached thereto. A coupling shaft 44 is connected between the connector 42 of the shaft 40 and the connector 32 of the seal unit shaft 30. The coupling shaft 44 includes two universal joints 45 therein so that differences in alignment between the flange connectors 32 and 42 is compensated for.

In operation of the agitator assembly 12, the electric motor 36 causes the shaft 40 of the gear box to rotate which in turn rotates the coupling shaft 44 and the lower and upper shafts 30 and 26 of the seal unit 22. The rotation of the shaft 26 rotates the agitator shaft 16 which in turn causes the agitator 14 to rotate.

As mentioned above, from time to time the seal unit 22 must be removed from the agitator assembly 12 for repair, and after being repaired, that unit or a different unit is reinstalled in the assembly. In order to remove the seal unit 22 from the assembly 12 and then reinstall a seal unit therein, a specific sequence of disassembly and assembly steps must be followed. Referring to FIGS. 1-5, to remove the seal unit 22 from the assembly 12, the first step which must be followed is the removal of the coupling shaft 44. This is accomplished by disconnecting the top and bottom coupling shaft connectors from the connectors 32 and 42 respectively. Upon the removal of the coupling shaft 44, the connection between the flange 24 of the seal unit 22 and the flange 20 of the vessel 10 is disengaged and as shown in FIG. 2, the seal unit 22, agitator shaft 16 and agitator 14 are all lowered a short distance whereby the connection between the seal unit shaft 26 and the agitator shaft 16, i.e., the connectors 28 and 18, are positioned below the vessel 10. In order to prevent the seal unit, agitator shaft and agitator from tilting or becoming misaligned while being lowered, a pair of guide rods 46 and 48 are passed through holes in the flange 24 of the seal unit 22 and threadedly connected into threaded bores in the vessel flange 20. After the seal unit, agitator shaft and agitator have been lowered, a support collar 50 is attached to the connector 18 of the agitator shaft 16.

As best shown in FIG. 3, the support collar 50 is comprised of two semi-annular parts 62 and 64 which bolt together by means of a pair of bolts 60 to form an annular flange. The parts 62 and 64 each include inwardly extending annular protuberances 66 and 68 which are sized to engage an annular groove 52 provided in the connector 18 of the agitator shaft 16. The semi-annular parts 62 and 64 also include semicircular recesses in adjacent ends thereof whereby when fitted together as shown in FIG. 3, holes 54 and 56 are provided through which the guide rods 46 and 48 extend. A pair of bolt holes 58 are also provided in each of the parts 62 and 64 which align with bolt holes in the flange 20 of the vessel 10.

After the support collar 50 has been clamped onto the connector 18 of the agitator shaft 16, the seal unit 22, agitator shaft 16 and agitator 14 connected thereto are raised to the position shown in FIG. 4, i.e., whereby the support collar 50 is positioned adjacent the flange 20 of the vessel 10. The support collar 50 is bolted to the flange 20 after which the connector 28 of the shaft 26 is disconnected from the connector 18 of the agitator shaft 16. This in turn disconnects the seal unit 22 from the assembly 12 and upon removal of the guide rods 46 and 48, the seal unit 22 is removed. As shown in FIG. 5, the support collar 50 holds the agitator shaft 16 and the agitator 14 connected thereto within the vessel 10 during the time the seal unit 22 is not present in the assembly 12.

In reinstalling a seal unit in the assembly 12, the steps described above are reversed. That is, the seal unit 22 is raised whereby the connector 28 of the seal unit is adjacent and aligned with the connector 18 of the agitator shaft 16. The connectors 28 and 18 are connected, the support collar 50 is disconnected from the flange 20 and the seal unit 22, agitator shaft 16 and agitator 14 are lowered. The support collar 50 is removed from the connector 18 and the seal unit 22, agitator shaft 16 and agitator 14 are then raised to position the flange 24 of the seal unit 22 adjacent the flange 20 of the vessel 10. The flange 24 is bolted to the flange 20 and the guide rods 46 and 48 are removed therefrom. The coupling shaft 44 is reconnected to the connectors 32 and 42 to complete the reinstallation of the seal unit 22 in the assembly 12.

Figure 10:
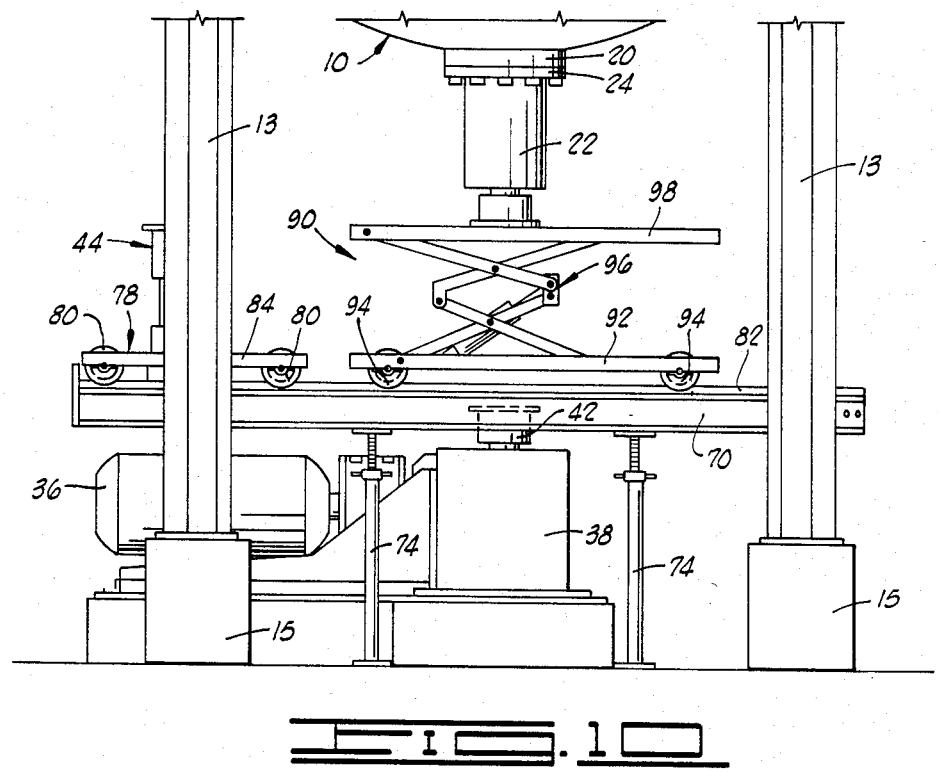
FIG. 10 is a side view similar to FIG. 7 illustrating the selectively elevatable table of the present invention mounted on the rails beneath the seal unit of the agitator assembly.

In carrying out the above procedure as well as other similar procedures in accordance with the present invention, and referring specifically to FIGS. 6 through 11, a pair of elongated horizontally positioned parallel rails 70 are first removably bolted beneath the process vessel 10, one on each side of the coupling shaft 44. In the arrangement illustrated, thwe rails 70 are positioned between and bolted to opposite pairs of vessel support members 13. That is, as best shown in FIGS. 6 and 8, brackets 72 are bolted to the supports 13 and to the rails 70. As shown in FIGS. 7 and 10, two or more adjustable supports 74 can be utilized between the rails 70 and the ground to provide additional support thereto at points between the vessel support members 13 if required. Also, as shown in FIG. 6, horizontally positioned work platforms 76 can be disposed on opposite sides of the rails 70 for providing surfaces from which workmen can have easy access to the assembly 12. The platforms 76 can be supported in various ways such as bolting them between pairs of vessel support members 13 and the rails 70.

Once the rails 70 have been installed beneath the vessel 10 adjacent the assembly 12, a movable dolly 78 is mounted on the rails and removably attached to the coupling shaft 44. As shown in FIGS. 7-9, the dolly 78 includes a frame 84 having a plurality of grooved wheels 80 rotatably attached thereto which engage longitudinal protuberances 82 on the rails 70. As shown in FIG. 9, one end of the frame 84 is open so that the dolly 78 can be positioned with the coupling shaft 44 within the interior thereof. A pair of height adjustable upstanding arms 86 are attached to the frame 84 on opposite sides thereof and a cross member 88 is removably attached to the arms 86. The cross member 88 is positioned through an opening in the coupling shaft 44 after which the coupling shaft 44 is disconnected from the assembly 12. The dolly 78 with the coupling shaft 44 attached thereto is then moved on the rails 70 to one end thereof whereby the dolly and coupling shaft are out of the way.

A hydraulically actuated selectively elevatable table 90 is next moved onto the rails 70 and positioned beneath the seal unit 22 as illustrated in FIG. 10. Like the dolly 78, the elevatable table 90 includes a frame 92 having grooved wheels 94 rotatably attached thereto which engage the protuberances 82 of the rails 70. A hydraulically-powered scissor lift 96 is connected to the frame 92 and to a tabletop 98 upon which the seal unit 22 is supported. The hydraulically actuated table 90 is utilized in the lowering and raising of the seal unit 22, the agitator shaft 16 and the agitator 14 in accordance with the procedure described above whereby the seal unit 22 is removed. Once removed, the seal unit 22 is supported on the top 98 of the elevatable table 90 and the top 98 is lowered. The table 90 is then moved on the rails 70 to the end thereof opposite the end where the dolly 78 and coupling shaft 44 are positioned so that the seal unit 22 can be taken to a location of seal unit repair or storage.

Preferably, as shown in FIG. 11, a wheeled selectively elevatable platform 100 is positioned adjacent the rails 70 at the ends thereof opposite the dolly 78. The platform 100 includes a second pair of rails 102 attached thereto which are connected to the first pair of rails 70 in longitudinal alignment therewith. The platform 100 is comprised of a base frame 104 having wheels 106 attached thereto connected by a hydraulically powered scissor lift 108 to a top member 110. The rails 102 are movably attached to the top 110 so that they can be positioned in alignment with the rails 70. The platform 100 can be positioned and towed by a vehicle removably connected to a towing lug 112 attached to the frame 104.

When the rails 102 of the platform 100 have been connected to the rails 70, the elevatable table 90 with the seal unit 22 thereon is moved from the rails 70 onto the rails 102. The rails 102 are then disconnected from the rails 70, the platform 100 is lowered and the platform 100 with the table 90 and removed seal unit 22 thereon is towed to a location of seal unit repair or storage. The removed seal unit 22 is repaired or replaced with a different unit and returned to the process vessel 10 and assembly 12 by means of the platform 100. The platform 100 is again elevated and the rails 102 are connected to the rails 70. The table 90 is moved from the rails 102 of the platform 100 to the rails 70, and the seal unit 22 is reinstalled in the assembly 12 in the manner described above using the elevatable table 90. Once the seal unit 22 has been installed in the assembly 12, the dolly 78 and coupling shaft 44 are moved to the assembly and the coupling shaft 44 is installed therein.

Upon completing the removal and reinstallation of seal units in the assembly 12, the platform 100, the table 90, the rails 70, the dolly 78, the supporting members 74 and other apparatus used for carrying out the method of this invention are removed from the location.

The method of the present invention allows seal units to be removed and reinstalled in bottom entering agitator assemblies in a manner whereby the coupling shaft and seal units are safely supported at all times. In addition, the seal units are quickly and efficiently removed, moved to a location of repair or storage, returned and reinstalled whereby the down time of the process vessel 10 is minimized. The present invention is thus well adapted to carry out the objects and attain the ends and advantages mentioned as well as those inherent therein. While a specific design of process vessel and bottom entering agitator assembly have been described for purposes of this disclosure, it is to be understood that the method of this invention is applicable to a variety of other similar vessels and assemblies. Further, numerous changes in the arrangement and construction of parts and sequence of steps can be made by those skilled in the art, which changes are encompassed within the spirit of this invention as defined by the appended claims.

The embodiments of the invention in which an exclusive property or privilege is claimed are defined as follows:

1. In a method of removing a seal unit from a process vessel bottom entering agitator assembly and reinstalling a seal unit therein wherein the assembly includes an agitator positioned within the vessel, an agitator shaft connected to the agitator having a connector at the bottom end thereof adapted to be connected to a support collar which is in turn adapted to be connected to the vessel, a seal unit having upper and lower shafts extending therefrom, the upper seal unit shaft being connected to the connector at the bottom end of the agitator shaft within the vessel and extending through a flanged opening in the vessel, the seal unit being positioned outside the vessel and connected to the flanged opening in the vessel and a coupling shaft connected to the lower seal unit shaft and to a rotary drive means, wherein the seal unit is removed by removing the coupling shaft from the assembly, disconnecting the seal unit from the flanged opening of the vessel, lowering the seal unit, agitator shaft and agitator connected thereto whereby the connection between the upper seal unit shaft and the agitator shaft is moved to a position outside the vessel, connecting the support collar to the connector at the bottom end of the agitator shaft, raising the seal unit, agitator shaft and agitator whereby the support collar is positioned adjacent the vessel, connecting the support collar to the vessel and then disconnecting the upper seal unit shaft from the agitator shaft whereby the seal unit is removed from the assembly and wherein a seal unit is reinstalled by carrying out the above steps in reverse order, the improvement which comprises:

removably installing a first pair of elongated horizontally positioned parallel rails beneath said vessel, one on each side of said coupling shaft with a selectively elevatable table movably mounted thereon;

utilizing said elevatable table in the lowering and raising of said seal units during the removal and reinstallation thereof and in the movement of said seal unit between said assembly and one end of said rails; and then removing said rails and elevatable table from beneath said vessel.

2. The method of claim 1 which is further characterized to include the steps of:

mounting a dolly on said rails; and attaching said coupling shaft to said dolly and moving said dolly and coupling shaft after its removal to an out-of-the-way position on said rails during the removal and reinstallation of said seal units; and then moving said dolly and coupling shaft back to said assembly for reinstallation of said coupling shaft therein.

3. The method of claim 1 which is further characterized to include the steps of:

positioning a wheeled platform having a second pair of horizontally positioned parallel rails attached thereto adjacent one end of said first pair of rails;

attaching said first and second pairs of rails together in longitudinal alignment; and moving said elevatable table with seal units thereon to and from said wheeled platform and utilizing said platform to move said seal units to and from a location of repair or storage.

4. The method of claim 3 wherein said wheeled platform is selectively elevatable.

5. The method of claim 1 which is further characterized to include the step of attaching one or more horizontal work platforms to said first pair of rails adjacent said assembly.

6. The method of claim 1 wherein said selectively elevatable table is hydraulically actuated.

7. The method of claim 4 wherein said selectively elevatable platform is hydraulically actuated.

* * * * *